May 11, 1965 V. J. DONADIO ETAL 3,182,788
FLEXIBLE IDLER ASSEMBLY
Original Filed Feb. 11, 1959 2 Sheets-Sheet 1

INVENTORS
Vincent J. Donadio
William F. Bankauf &
BY Clayton H. Skinner
Burgess, Ryan & Hicks
ATTORNEYS May 11, 1965  V. J. DONADIO ETAL  3,182,788
FLEXIBLE IDLER ASSEMBLY Original Filed Feb. 11, 1959  2 Sheets-Sheet 2

INVENTORS
Vincent J. Donadio
William F. Bankauf &
BY Clayton H. Skinner
Burgess, Ryan & Hicks
ATTORNEYS

# United States Patent Office 3,182,788
Patented May 11, 1965

3,182,788
FLEXIBLE IDLER ASSEMBLY
Vincent J. Donadio, Pompton Plains, and William F. Bankauf, East Paterson, N.J., and Clayton H. Skinner, Kenmore, N.Y., assignors to Hewitt-Robins Incorporated, Stamford, Conn.
Continuation of application Ser. No. 792,536, Feb. 11, 1959. This application May 15, 1964, Ser. No. 369,353
6 Claims. (Cl. 198—192)

The present invention relates to a flexible idler assembly for a belt conveyor and relates, more particularly, to a flexible idler assembly for supporting the load-carrying reach of a conveyor belt in a troughed shape.

This application is a continuation of application Serial No. 792,536, filed February 11, 1959, entitled "Flexible Idler Assembly."

An object of the present invention is to provide a flexible idler which will have a curved or arcuate contour and which will support a conveyor belt in a corresponding troughing shape without angular bends in the belt. An idler made in accordance with the present invention will normally assume an arcuate configuration approximating a catenary curve when it is suspended from its ends at two spaced points and a conveyor belt will readily conform to the curved configuration of the idler without sharp bends or being specially constructed.

Another object of the present invention is to provide a flexible idler which can freely shift in its configuration in response to changes in the transverse position of the load with respect to the belt.

A further object of the present invention is to provide a flexible troughing idler which will not be damaged or weakened by frequent flexing and changes in its configuration and which will resist damage in the event there is relative movement between it and the belt.

Another object of the invention is to provide a flexible idler assembly in which the idler and various parts thereof can be installed or removed for repair with a minimum of difficulty.

Another object of the invention is to provide a flexible idler assembly which can be constructed economically and which will insure long life for both the idler and the belt even under severe operating conditions.

Other objects and advantages of the invention will be apparent and best understood from the following description and the accompanying drawings in which.

Figure 1:
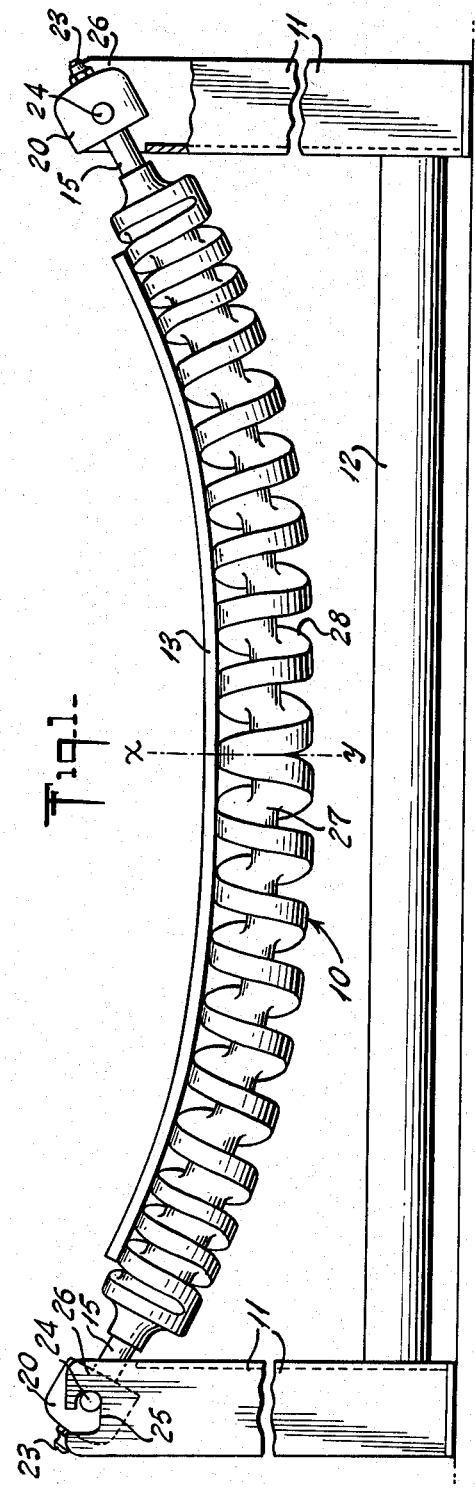
FIG. 1 is an elevational view of a flexible idler assembly embodying the present invention.

Referring to the drawings in detail, and to FIG. 1 in particular, there is a flexible idler assembly 10 which is made in accordance with the present invention.

The idler assembly 10 is supported at its ends from vertical supports 11 which are held in fixed spaced relation to each other by a tie rod or bar 12. As illustrated, the idler extends transversely beneath the conveyor belt 13 and normally assumes an arcuate or curved configuration which approximates a catenary curve. The conveyor belt is thus supoprted in a smoothly curved trough-like shape which enables the belt to retain and convey loose or granular material such as coal or the like more readily.

In this connection it should be noted that the idler being flexible is free to shift or change its configuration to correspond to shifts or changes in the transverse position of the load with respect to the center line x–y of the belt and the idler.

Figure 2:
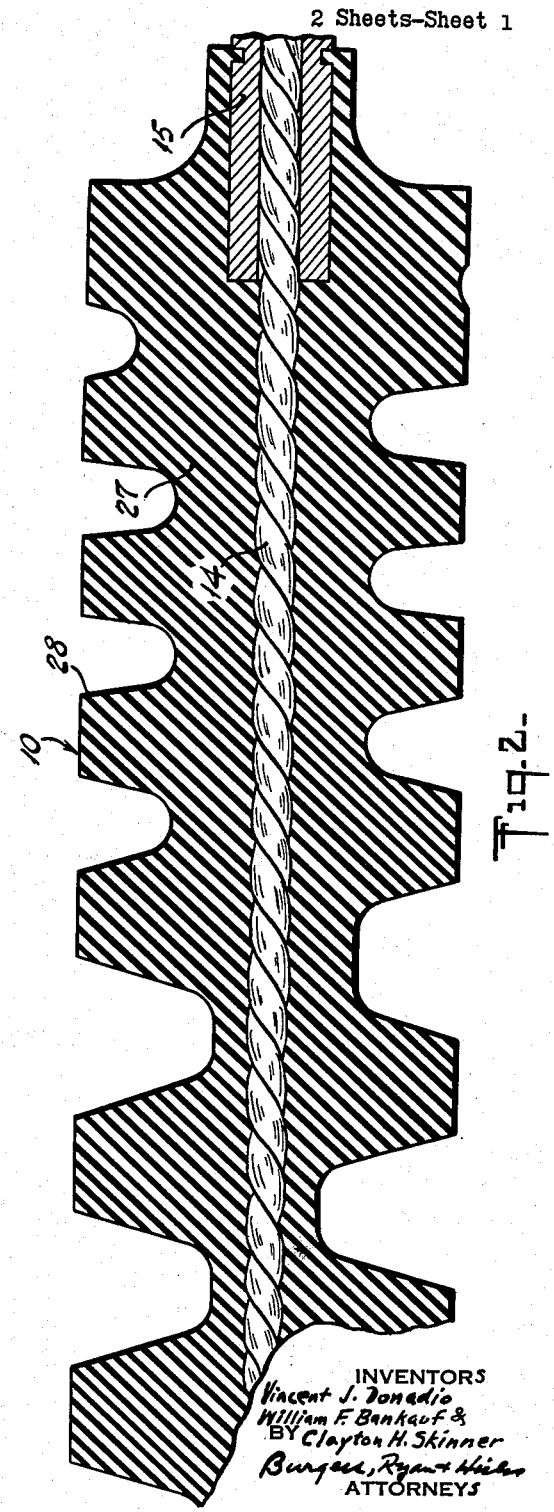
FIG. 2 is a section view of a portion of the idler assembly illustrated in FIG. 1, but on an enlarged scale.
Figure 3:
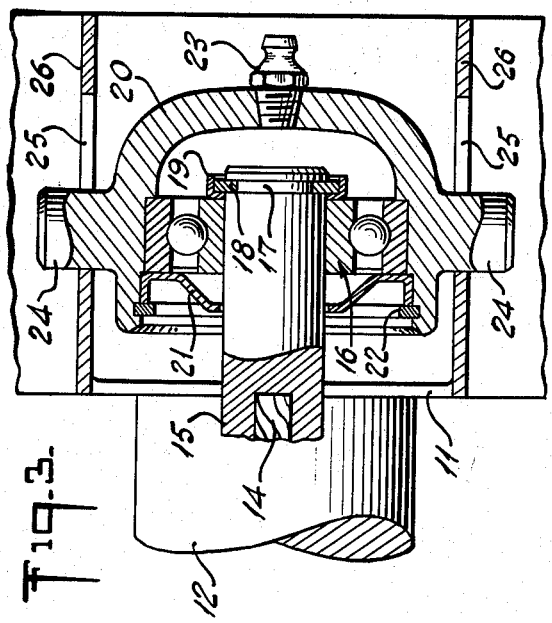
FIG. 3 is a section view of another portion of the idler assembly illustrated in FIG. 1, but on an enlarged scale.

As is shown best in FIGS. 2 and 3, the flexible idler includes a central reinforcing member 14 which is formed of flexible cable such as wire rope or the like and which imparts the required tensile strength to the idler. A short length of shaft 15 is attached to each end of the cable. The attachment of the cable to the shaft may be accomplished by inserting the end of the cable into an opening in the inner end of the shaft and then swaging the shaft onto the cable.

The outer end of the shaft extends through the central opening of the inner race of a ball bearing 16. The outer end of the shaft projects beyond the end of the bearing and is provided with a circumferential groove 17 in which a horseshoe washer 18 is seated. The washer is of larger diameter than the central opening in the bearing and is held in place by a retaining cup 19 which extends around the shaft with its bottom being located between the end of the bearing and the washer. Thus, when these parts are assembled in operative condition, as shown in FIG. 3, the washer cannot become dislodged. The parts can be readily disassembled for servicing by sliding the shaft to the right with respect to the bearing as seen in FIG. 3 until the washer has been moved out of the retaining cup, then removing the washer from the groove in the shaft and then sliding the end of the shaft to the left.

The outer race of the ball bearing is seated in a bearing housing 20 which has an opening at one end through which the entire bearing assembly can be inserted. A cover 21 in the form of a shaped annular plate through which the shaft extends closes the open end of the housing. The cover has a shoulder which engages with the outer race of the bearing and a peripheral flange which engages with a spring retaining ring 22 seated in a circumferential groove in the interior of the opening in the bearing housing. Thus, the retaining ring holds the cover and the bearing in place. A lubrication fitting 23 which is provided at the other end of the bearing housing communicates with the interior of the housing and the bearing.

The bearing housing has two oppositely disposed pivot arms 24 projecting from the sides thereof. The arms fit into slots 25 in oppositely disposed, spaced portions of a bracket 26 carried at the top of the vertical support post. This arrangement permits the bearing housing to pivot freely in a vertical plane about a horizontal axis extending parallel to the side edge of the belt and enables the flexible idler to assume its catenary configuration under normal conditions or to shift its configuration to conform to various load conditions without imposing an undue strain on any particular portion of the assembly.

At the same time the central portion of the idler, including the shafts, is free to rotate under the influence of belt movement. It will also be understood that the idler can, if desired, be supported by means other than the vertical posts. For example, the brackets 26 may be part of a plate which can be attached by clamps or other suitable means to flexible cables extending along the sides of the belt in a flexible side-frame type of conveyor.

The roll or body portion 27 of the idler is formed of a resilient plastic material, such as rubber, which is molded on the central reinforcing member. The roll has a rib formed on the outer surface thereof. The rib advances in a helical path lengthwise of the roll with the adjacent convolutions of the rib being spaced apart, giving it the appearance of a square cut screw thread. As will be seen from the drawings, the helical rib which constitutes the belt contacting and supporting member of the idler roll has a root defining portion which extends between adjacent convolutions of the rib in a helical path lengthwise of the idler roll and which is smaller in diameter than the overall diameter of the rib. The rib and the root defining portion, being integral, form a protective cover for the cable throughout the length of the idler roll.

Figure 4:
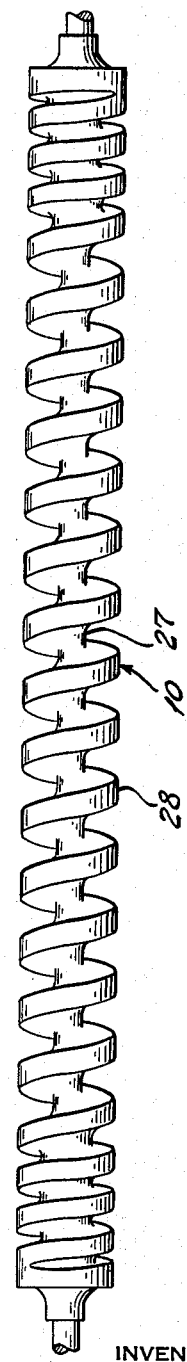
FIG. 4 is a fragmentary plan view of a modified form of flexible idler for use in the assembly illustrated in FIG. 1.

As is pointed out hereinafter, the depth of the rib or the diameter of the root defining portion may be varied to obtain the desired bending action and strength under loaded conditions. The outer surface of the rib which contacts with the bottom surface of the belt is flat and of uniform diameter. The rib may advance in opposite directions (one being a right hand and the other a left hand thread) from the center line x–y of the idler to the opposite ends thereof, as shown in FIG. 1, or it may advance in the same direction from end to end, as shown in FIG. 4. When the rib advances in opposite directions from the center line of the idler, a self-training effect is exerted on the belt.

The helical form of the rib on the outer surface of the idler roll provides spacing between the rib convolutions which is deep enough to permit flexibility for bending of the idler in a catenary type arc. At the same time the rib is of a thickness transverse to its length such that it provides sizeable resistance to torsional displacement of any portion of the idler roll with respect to other portions thereof under influence of movement of the belt. The helical rib makes it practically impossible for any portion of the idler roll to be displaced with respect to or twisted loose from other portions thereof or the central cable as any such twisting or movement of parts of the idler roll relative to each other is directly resisted by the full cross-section of the rib. The spacing between adjacent convolutions of the rib also assures that the idler will be self-cleaning under the continuous flexing action which takes place during operation of the conveyor.

It will be noted that the idler roll surrounds the flexible cable throughout its length. Thus, the entire length of the cable shares in or contributes to the total bending requirement and there are no abrupt changes or differences in the flexibility of the idler throughout its length. Uniform flexibility is obtained at the central portion of the idler (in a lengthwise direction) where the greatest flexibility is required by uniform rib depth and spacing between the rib convolutions.

The flexibility at the ends of the idler may be decreased to provide greater belt support and to prevent undue flexing at the points where the cable is attached to the shaft by decreasing the depth of the rib or, conversely, increasing the diameter of the root portion and also by decreasing the pitch of the rib or spacing between adjacent convolutions of the rib. An example of this is shown in FIGS. 1 and 2 where the pitch of the helix for the rib 28 decreases at the ends of the idler roll with the width of the rib and the depths of the spaces between adjacent convolutions of the rib being gradually decreased. As shown in FIG. 2, the first three turns or convolutions of the rib have the least depth and root portions of the largest diameter with the closest spacing between adjacent convolutions. The depth of the rib and the spacing between adjacent convolutions along with the width of the rib then gradually increases through a single turn until the full width, depth and spacing of the rib is reached. The reduction in the pitch of the rib toward the end of the idler roll provides additional support for the edges of the belt and it also adds a certain amount of stiffness in a region where angular deflection is least. The added stiffness is also at a point where the flexible cable joins the shaft and tends to eliminate any undue bending stress which might take place at this point.

The idler, thus, has end sections or portions and a central section or portion defined, respectively, by the reduced pitch of the rib and the greater diameter of the root portions at its ends and the increased pitch of the rib and the smaller diameter of the root portions at its center. As is shown in the drawings, the diameter of the root portion of the idler is less than one-half the overall diameter of the rib throughout the central portion of the idler.

It will be understood that various changes and modifications may be made in the embodiments of the invention which have been described and illustrated herein without departing from the scope of the invention as defined by the following claims.

We claim:

1. A flexible idler for supporting an endless conveyor belt in a trough shape, which idler comprises a central flexible core and a roller means adapted to contact and support a conveyor belt at spaced points across the width of the belt, said roller means comprising a body of rubber-like flexible material mounted on the flexible core extending lengthwise of the core intermediate its ends, said body having an upstanding rib-like element formed thereon extending around and lengthwise of said body in the form of a helix having spaced convolutions concentric with said flexible core, said rib-like element defining a root portion of said body extending between adjacent convolutions of said rib-like element, said rib-like element having an outer belt contacting surface, said outer surface being spaced a substantial distance from the root portion through out the central portion of said body, said root portion being concentric with said flexible core and the periphery of the root portion progressively increasing in diameter throughout at least two convolutions of said rib-like element, at each end of said body.

2. A flexible idler as defined in claim 1 wherein the pitch of the helical rib-like element progressively decreases within the latter convolutions at each end of the body.

3. A flexible catenary idler roller comprising a central flexible core resistant to elongation but relatively flexible in a direction transverse to the longitudinal axis of said idler roller, said roller further comprising a continuous member of a rubbery material extending lengthwise substantially concentrically along said core, the continuous member forming a cover for said core and a load transmitting means for contacting a belt to be supported by said roller and transmitting the static and dynamic load of the belt to said core, said core having means adjacent the ends of said roller for connection to bearings for rotatably supporting said roller, said continuous member comprising a continuous helical element extending lengthwise along and intermediate the ends of said member, said helical element providing the belt contacting surface of said member, said helical element constituting the load transmission means of said member, said helical element being continuous along the load carrying portion of said idler, said helical element being rigidly secured to said core along the whole length of said element and being adapted to transmit load applied tangentially to said roller to said core within said element uniformly along the whole length of said helical element, said helical element forming adjacent coils, said continuous member having a portion extending helically along said core intermediate the adjacent coils of said helical element and forming a continuous cover for said core with said helical element, said helical element having a pitch and said portion being of such a minimum thickness transversely of said core with respect to said helical element throughout the medial portion of said roller such that the flexibility of said core substantially determines the transverse flexibility of said roller with said helical element being of a thickness transverse its length such that it resists torsional displacement of portions of said roller within the length of said element relative each other, and said helical element and said core being of a uniform construction intermediate the ends of said elements and thus providing uniform flexibility of said roller intermediate the ends of said element.

4. A flexible roller for supporting a conveyor belt comprising, an elongated flexible core having a central axis and being adapted to be rotatably supported at its ends, a body of flexible material covering said core and being concentric therewith, said flexible body extending lengthwise of the core between its ends, belt contacting and supporting means formed integrally with the flexible body and extending outwardly therefrom, said belt contacting and supporting means terminating in outer belt contacting surfaces which are spaced longitudinally relative to each other along the length of the body in any given plane intersecting the axis of said flexible core, and means incorporated in the flexible body for imparting increased stiffness to the body and the core in areas adjacent the ends thereof, said last-mentioned means comprising progressive increases in the diameter of the flexible body adjacent the ends thereof, said incerases in diameter starting at points spaced from each end of the body and reaching a maximum adjacent the respective ends thereof.

5. A flexible roller for supporting a conveyor belt comprising, an elongated flexible core having a central axis and being adapted to be rotatably supported at its ends, a body of flexible material covering said core and being concentric therewith, said flexible body extending lengthwise of the core between its ends, belt contacting and supporting means formed integrally with the flexible body and extending outwardly therefrom, said belt contacting and supporting means terminating in outer belt contacting surfaces which are spaced longitudinally relative to each other along the length of the body in any given plane intersecting the axis of said flexible core, and means incorporated in the flexible body for imparting increased stiffness to the body and the core in areas adjacent the ends thereof, said last-mentioned means comprising progressive increases in the diameter of the flexible body adjacent the ends thereof, said increases in diameter starting at points spaced from each end of the body and reaching a maximum adjacent the respective ends thereof with the longitudinal spacing between the belt contacting surfaces diminishing at the ends of the flexible body.

6. In an idler assembly of the type wherein a flexible idler roller is rotatably supported at its outer ends and is adapted to conform to and support a loaded reach of a conveyor belt in a trough-like shape, the improvement which comprises a rotatable roller, said roller including a body of flexible material having a central axis and extending lengthwise between the ends of the roller, said roller body having outwardly extending portions formed thereon which terminate in belt contacting and supporting surfaces, said belt-contacting surfaces being spaced longitudinally relative to each other along the length of the body in any given plane intersecting the central axis thereof which is characterized by there being progressive increases in the diameter of the flexible body at each end thereof, said increases in the diameter of the body starting at points spaced from each end of the body and reaching a maximum diameter adjacent the ends thereof whereby flexibility of the roller at its ends is decreased as compared to flexibility at the center thereof.

References Cited by the Examiner
UNITED STATES PATENTS
2,837,202    6/58    Baechli.

SAMUEL F. COLEMAN, *Primary Examiner.*